United States Patent
Nomura et al.

[15] 3,668,364
[45] June 6, 1972

[54] WELDING METHOD

[72] Inventors: Hirokazu Nomura; Akira Sasaki, both of Yokohama, Japan

[73] Assignee: Nippon Kokan Kabushiki Kaisha, Tokyo, Japan

[22] Filed: May 4, 1970

[21] Appl. No.: 31,873

Related U.S. Application Data

[63] Continuation of Ser. No. 794,957, Jan. 29, 1969, abandoned.

[30] Foreign Application Priority Data

Feb. 19, 1968 Japan..........................43/10094

[52] U.S. Cl. ....................................................219/125 R
[51] Int. Cl. ..........................................................B23k 9/12
[58] Field of Search................219/123, 124, 125, 126, 130, 219/137, 60 R, 60 A

[56] References Cited

UNITED STATES PATENTS

| | | | |
|---|---|---|---|
| 1,580,020 | 4/1926 | Cutler et al. | 219/125 |
| 3,035,156 | 5/1962 | Staley | 219/125 |
| 3,182,178 | 5/1965 | Libby | 219/130 |
| 3,336,460 | 8/1967 | Hauck et al. | 219/123 X |

*Primary Examiner*—J. V. Truhe
*Assistant Examiner*—L. A. Schutzman
*Attorney*—George B. Oujevolk

[57] ABSTRACT

A welding method used in electric arc welding wherein a consumable wire core electrode is fed by a nozzle onto a workpiece at a welding station. The nozzle moves relative to the workpiece at a changeable speed including intermittent motion so as to provided an agitating action to the weld metal, the intermittent motion being in the form of oscillations at between 0.2 to 4 Hz and small amplitude along the direction of the weld seam.

2 Claims, 4 Drawing Figures

PATENTED JUN 6 1972 3,668,364
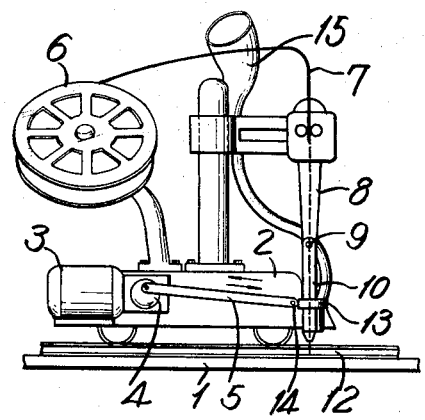
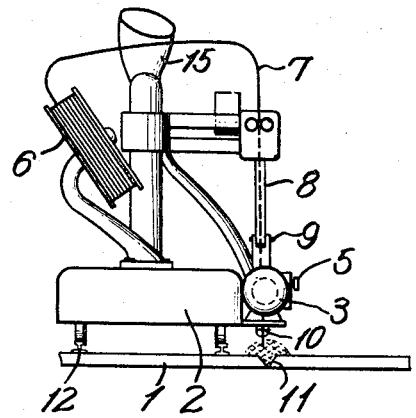
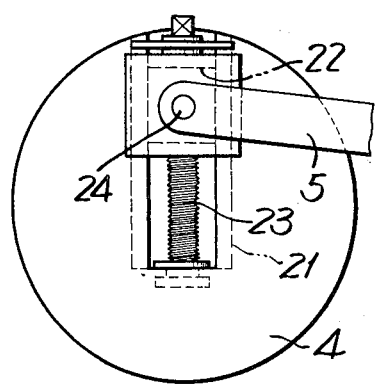
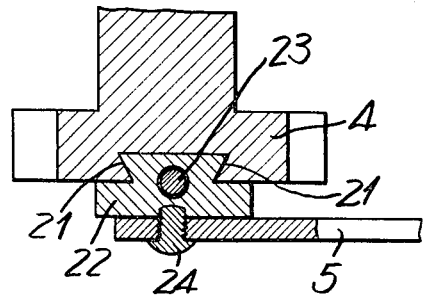

WELDING METHOD

This application is a continuation of application Ser. No. 794,957 filed Jan. 29, 1969, now abandoned.

BACKGROUND OF THE INVENTION

This invention relates to arc welding with a consumable wire core electrode and more particularly a welding method, especially suitable for automatic welding.

It is well known that welding is performed while feeding manually or automatically a wire core material i.e., an electrode, to a workpiece at a work station. The welding speed generally depends upon welding conditions such as thickness of plate diameter of electrode wire, supply of flux and condition of edge preparation. Welding is carried out on the premise that each of these conditions are constant, or, at a welding rate of a certain uniform motion. Assuming that a strictly uniform motion cannot be obtained in manual welding, in theory, the operation should be carried out accordingly with constant motion. Especially in automatic welding, carried out by feeding electrode wire automatically, the welding operation should be carried out with mechanical precision. However, such conventional methods cannot ensure a satisfactory welding, due to disadvantages such as obstacles and failure to contact metal properly caused by developments of blow holes in a work section, defects in the steel material itself such as lamination, rust on the work section, or the mixture of oil or other impurities into the work section. Furthermore, loss of contact and insufficient welding penetration are also a considerable cause or obstacle against good welding. An attempt to eliminate these causes to some extent naturally result in limiting the welding speed. Since a blow hole causes the structure of welded metal to have reduced strength, close attention must be paid to elimination of blow holes. However, this defect cannot be prevented completely, especially at a high welding speed. The quick formation of the weld and its rapid cooling cause the formation of blow holes, which formation is accelerated by fat, oil, rust, paint or other impurities. Accordingly when welding, it is essential to first wipe carefully the work sections to remove fat, oil, rust, paint etc., and then to perform the welding at a limited speed. Working must be such as to prevent the inclusion of slag and to obtain desirable welding penetration. Indeed conventional automatic welding can work continuously with high efficiency, but its welding rate is naturally limited. According to conventional welding, for example, when a base material is used which is unsuitable for obtaining predetermined precision owing to awkward cutting, the welding clearance becomes irregular and causes loss of welding contact. Further, if the welding is carried out under working conditions which can prevent loss of welding contact, satisfactory welding penetration often cannot be obtained. Although a large current and a high welding speed are recommended for welding with high efficiency, the above technical circumstances do not permit the welding speed to exceed a certain limit. Furthermore, one-side automatic welding, i.e., a system which accomplishes welding only from one side requires uniformity of welding penetration. Thus, in this case, a backing is indispensably required for a uniform backing bead. This requires a special and expensive backing device which can be handled through fairly complicated procedures or similar consumable backing material.

The present invention is a result of having made a careful examination of prior welding methods, and various studies in practice and literature. The fundamental object of the present invention is to secure a compact and sound metal structure of the welded portion with no defect such as the occurrence of blow holes or the inclusion of slag. For such a welding, although it is the objective of workers to obtain a sound structure or welded portion, there is no way of fulfilling these objectives effectively. According to the present invention, in order to prevent the development of blow holes, an agitating action is given to the weld metal by the welding operation itself, eliminating effectively the causes of developing blow holes such as hydrogen, lamination and others. This agitating action to the weld metal by the welding operation itself is performed by non-uniform action including stopping of the welding operation, or further by oscillating actively the electrode case wire in the opposite direction to the forward direction, namely in reverse. Such a motion or operation though not a uniform motion, can relatively easily be given, thereby obtaining a rigid welded structure.

Another object of the present invention is to perform welding with high efficiency. In almost all cases, large current or other means for achieving highly efficient welding are needed but various technical circumstances hamper achieving a satisfactory high speed operation. The present invention prevents the development of blow holes and the inclusion of slag and other impurities by the agitating action of the weld metal, so as to raise the welding speed. Experiments show that the system of the present invention is considerably higher in welding speed than those of the prior art and moreover can effectively prevent the development of blow holes and other defects.

Another object of the present invention is to offer welding method which does not need or considerably simplifies the removal of rust, fat, oil, paint or the like on edged portions or other portions when welding. The welding methods of the prior art requires first of all cleanly wiped edges in preparation for welding. For this, careful treatment is required such as cleaning with wire brush, buffing or the like and moreover preheating just before welding. Since the present invention removes the development of blow holes by giving an agitating action to the weld metal, there is no need to remove rust, oil fat, paint or the like, and moreover disadvantage due to lamination in the steel itself can also be prevented, so that a simplified sound and effective welding can be achieved.

Another special object of the present invention is to provide an automatic one side welding which forms a uniform backing bead. That is to say, according to the present invention the welding is performed by making the amplitude of oscillation of the electrode wire relatively large and moreover by a slow vibrating speed of the electrode wire, so that a desirable backing bead can be formed and one side welding can be accomplished by a simple operation.

A further object of the present invention is to practice high speed automatic welding. Accordingly, when performing oscillation of the electrode wire the present invention reduces the amplitude of oscillation of the electrode wire and further increases the vibrating speed. In this way the welding can be performed at a rate approximately three times or higher than that of the prior art.

SUMMARY OF THE INVENTION

Generally speaking, the present invention contemplates a welding method used in electric arc welding wherein a consumable wire core electrode is fed by a nozzle at a welding station onto a workpiece, there being relative motion between the nozzle and the workpiece. The nozzle moves in the direction of welding but at a changeable speed, including intermittent motion so as to provide an agitating action to the weld metal.

The invention as well as other objects and advantages of the invention will be more clearly understood with reference to the following detailed explanation and with reference to the accompanying drawings, in which:

FIG. 1 is a side view of an automatic welding machine of one of the embodiments of the present invention, in which the electrode wire oscillates;

FIG. 2 is a front view of the machine shown in FIG. 1;

FIG. 3 is an explanatory view of the adjusting mechanism of a rotary disc portion of the machine;

FIG. 4 is a sectional view along line 8—8 of FIG. 3;

The method of the present invention is carried out at an intermittent speed. Although this welding speed can be manually controlled, it can be exactly controlled as desired when the present invention is applied to an automatic welding machine. In this case, the power transmission to the carriage motor which is generally adopted by this kind of automatic welding machine, is automatically switched, such as on-off-on-off, etc. by any known programming control, thereby controlling the movement of the welding pool by time, namely in cycles such as stop-run-stop-run, etc. The electric current for welding is preferably carried out by the use of the electrode wire itself, however, if the circumstances requires electric current may be supplied by using another electrode and feeding in succession electrode wire thereto. The system of heating by flame may be also used.

When the ignition of the arc and the feeding of the electrode wire are done separately, it is also necessary that the feeding point of the electrode wire and the welding arc co-operated.

According to the results a number of tests of intermittent running under various conditions in addition to the above embodiments, the inventors have confirmed that desirable results are generally obtained by intermittent running with electric current of 400A to 1000A in the range of about 0.2. to about 5 Hz. In this case practical welding rates are generally above 1,000mm/min. As its upper limit a welding rate up to 2,000mm/min. can be used. As the welding work is intermittent, a carriage and base material repeats the stop and go at an average rate of 500 to 1,000mm/min. Thus a welding rate of about twice as fast as that of the prior art can be secured. Moreover, the present invention does not require the cleaning off of paint or rust between workpiece edges, because the heat accumulating time increases and appropriate agitation is exerted to the welded metal. Thus the method of the present invention is most effective when applied to such edges as I-shapes, fillet weld (a fillet has a great possibility of having paint, rust or the like which should usually be cleaned with grinder or wire brush).

FIGS. 1 to 4 show an example of another embodiment of the present invention, namely a device for welding while giving oscillation to the electrode wire. FIGS. 1 to 4 schematically show a self-running arc welding machine which has further developed the above conception of the present invention so as to forcibly oscillate the wire core electrode forward and backward. A carriage 2 placed on base material 1 runs on rail 12 along the edge 11. Prime motor 3 provided beside carriage 2 transmits its rotary power to rotary disc 4 through appropriate speed reducing means. As shown in FIG. 3 and FIG. 4, there is provided in the rotary disc 4 and adjusting mechanism which is so designed as to move slide member 22 fit into guide groove 21 by rotation of regulating shaft 23. Slide member 22 of the amplitude adjusting mechanism is connected with piston 5 by pivot 24. On carriage 2 is mounted a fixed nozzle section 8 for feeding electrode wire 7 therethrough from wire reel 6. This fixed nozzle section 8 is connected at the lower part thereof with oscillating nozzle section 10 by a pivot 9. These nozzle sections 8, 10 feed electrode wire 7 to edge 11. Connecting member 13 of oscillating nozzle section 10 is connected with the end portion of piston 5 by pivot 14. The flux supply 15, and current for electrode wire 7 is provided in carriage in a known manner.

An appropriate amplitude is set by moving slide member 22 of rotary disc 4, and in this condition, the rotation of motor 3 permits oscillating nozzle section 10 reciprocate forward and backward through piston 5 and connecting member 13. The periodic speed of this reciprocating movement can be set as desired by changing the rotary speed of motor 3 or by a change gear built-in reduction mechanism. If it is undesirable to install the amplitude adjusting system with a rotary disc on the slide member, it is possible to use an arrangement of merely pivoting the base end of piston 5 to the rotary disc 4 or the crank corresponding thereto, so as to change at will the height for mounting the connecting member 13 relative to oscillating nozzle section 10, and thereby changing the distance from pivot 9. In case of a system using a fixed welding machine and a base material 1 moved by means of a conveyor system, the welding method of the present invention is applicable by using an oscillation system such as a rotary disc or crank to oscillate the nozzle section 10 which is pivotally connected to the fixed nozzle section 8.

When the electrode oscillation system of the present invention is applied to an automatic arc welding machine or a welding system of moving base material, molten metal in the weld is better agitated than by intermittent running. This permits prevention of blow holes quickly and completely, and to achieve weld penetration in a compact and uniform metal structure. The oscillating of the electrode in the direction of the edge line contributes to higher welding speed.

According to various experiments conducted by the inventors on many kinds of base materials, although welding speed and amplitude of oscillation somewhat depends upon thickness of plate precision of clearance, electric current and voltage, a slow speed of oscillation or vibration and a relatively large oscillation are preferred in order to form uniform back bead by one side welding. The speed therefor is suitable with the frequency condition of 0.2 to 4 Hz and an amplitude of 20 to 100 mm. One side welding is less affected by the precision of edge preparation as conventional welding and can be smoothly worked on material which is relatively rough. When backing welding is used, it does not depend upon adhering pressure contrary to conventional welding. This simplifies the construction of the device and facilitates handling.

When high speed automatic welding is required without relation to the above backing bead, high speed automatic welding can be carried out at a high vibration rate (frequency) and with large amplitude. Generally a rate of 5 to 20 Hz and amplitude in the order of 2 to 15 mm. are recommended. Several typical examples in this case are shown in Table I.

TABLE I

| Thickness of plate | Diameter of wire, mm. | Electric current, amp | Voltage, v. | Welding rate, mm. | Osc. freq. | Osc. amp., mm. |
| --- | --- | --- | --- | --- | --- | --- |
| 6F | 3.2 | 520 | 36 | 850 | 20/sec | 2-4 |
| B | 3.2 | 600 | 37 | 850 | 20/sec | 2-4 |
| 10F | 4.0 | 800 | 40 | 800 | 15/sec | 4-8 |
| B | 4.0 | 1,000 | 42 | 750 | 15/sec | 4-8 |
| 15F | 4.0 | 1,000 | 42 | 700 | 10/sec | 6-10 |
| B | 4.0 | 1,100 | 43 | 650 | 10/sec | 6-10 |
| 20F | 4.8 | 1,150 | 43 | 650 | 5/sec | 8-12 |
| B | 4.8 | 1,250 | 45 | 600 | 5/sec | 9-12 |

Note: Thickness of plate is indicated in mm. F, Face, and B: Back side

In any case, the method of the present invention can raise welding rate up to three times as fast as that of the prior art. A two-electrode tandem system can also considerably increase the welding ratio by oscillation or vibration e.g., weaving similar to a single-electrode system. Moreover this weaving thus adopted reduces bead width and melting ratio of base material too, and consequently this reduces the portion to be affected by heat and the area made brittle by welding. The increase of cooling rate improves impact value produced by load. Thus, the present invention has broken down the prior conception of uniformity in this type of welding. The present invention can achieve very advantageous and highly efficient work by giving slow and rapid motion, stopping, vibration or oscillation to the electrode, and moreover can appropriately prevent disadvantages such as occurrence of blow holes so as to permit making sound and compact welding. Another advantage of the present invention is that it eliminates the removal of oil, fat, rust, paint etc. from base material and can form a uniform and fine backing bead by one side welding. Also, the present invention can cover defects or steel itself such as lamination so that the grade of steel material be made lower.

What is claimed is:

1. An electric arc welding method comprising: feeding a consumable wire core electrode through a nozzle onto a workpiece at a welding station and oscillating said nozzle along the line of the welding being formed so as to maintain relative movement between said nozzle and said workpiece while providing a welding current between about 400 to about 1,000 amperes, thereby also oscillating the arc between said consumable wire and said workpiece, the welding speed being at a rate of between about 1,000 and 2,000 mm/sec and the oscillation being at the rate of 0.2 to 4 Hz the amplitude of oscillation being from 20 to 100 mm, the oscillation providing an agitating effect on the weld metal.

2. The electric arc welding method of claim 1, wherein the oscillation is at a rate of 5 to 20 Hz and the amplitude of oscillation is between 2 and 15 mm.

* * * * *